United States Patent
Morimoto et al.

(10) Patent No.: US 7,391,746 B2
(45) Date of Patent: Jun. 24, 2008

(54) POWER SAVING METHOD IN WIRELESS LAN SYSTEM FOR PERMITTING TERMINAL STATION TO PROMPTLY TRANSITION TO DOZE STATE BY TRANSMITTING EMPTY DATA FRAME

(75) Inventors: Shinichi Morimoto, Tokyo (JP); Hideki Kurokawa, Tokyo (JP); Youko Omori, Tokyo (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 11/166,276

(22) Filed: Jun. 27, 2005

(65) Prior Publication Data

US 2005/0286454 A1 Dec. 29, 2005

(30) Foreign Application Priority Data

Jun. 28, 2004 (JP) .............................. 2004-189759

(51) Int. Cl.
*G08C 17/00* (2006.01)
(52) U.S. Cl. ..................... 370/311; 455/343.1; 455/574; 340/7.32; 370/338
(58) Field of Classification Search ......... 370/310–350; 455/343.2, 574; 340/7.32
See application file for complete search history.

(56) References Cited

U.S. PATENT DOCUMENTS

2005/0136833 A1* 6/2005 Emeott et al. .............. 455/11.1

FOREIGN PATENT DOCUMENTS

| JP | 2003-517741 | 5/2003 |
|---|---|---|
| JP | 2004-104465 | 4/2004 |
| JP | 2007-515903 | 6/2007 |

OTHER PUBLICATIONS

IEEE Standard for Information technology—Telecommunications and information exchange between systems—Local and metropolitan area networks—Specific requirements, "Part 11: Wireless LAN Medium Access Control (MAC) and Physical Layer (PHY) Specifications", *ANSI/IEEE Std 802.11*, 1999 Edition, pp. 95-136.

* cited by examiner

*Primary Examiner*—Rafael Perez-Gutierrez
*Assistant Examiner*—Amancio Gonzalez
(74) *Attorney, Agent, or Firm*—Young & Thompson

(57) ABSTRACT

A power saving method in a wireless LAN system is disclosed for permitting a terminal station to promptly transition to a doze state irrespective of the presence or absence of data destined to the terminal station in a base station. Upon receipt of a PS-Poll signal from a terminal station subordinate to a base station for prompting a transmission of data destined to the terminal station, the base station transmits an ACK signal to the terminal station for indicating a successful reception of the PS-Poll signal. Further, the base station transmits a data frame including data destined to the terminal station when there is such data, or transmits an empty data frame when there is no data destined to the terminal station. Then, upon receipt of the data frame (including the empty data frame), the terminal station transmits an ACK signal to the base station, and then transitions to the doze state in which a transmission/reception function is made inoperative.

3 Claims, 5 Drawing Sheets when data destined to the terminal station has not been stored when data destined to the terminal station has been stored

PRIOR ART　　PRIOR ART when data destined to the terminal station has not been stored when data destined to the terminal station has been stored when data destined to the terminal station has not been stored when data destined to the terminal station has been stored

US 7,391,746 B2

POWER SAVING METHOD IN WIRELESS LAN SYSTEM FOR PERMITTING TERMINAL STATION TO PROMPTLY TRANSITION TO DOZE STATE BY TRANSMITTING EMPTY DATA FRAME

BACKGROUND OF THE INVENTION

1. Field of the Invention

The present invention relates to a power saving method in a wireless LAN system, and more particularly, to a power saving method in a wireless LAN system conforming to IEEE802.11.

2. Description of the Related Art

Power saving in a wireless LAN system conforming to IEEE802.11 is performed in sequences illustrated in FIGS. 1A, 1B, for example, as disclosed in IEEE Std 802.11, 9.7 Frame exchange sequences Table 21 Frame sequence.

FIG. 1A is a sequence chart illustrating a sequence of operations when no data destined to a terminal station is stored in a base station. The terminal station transmits PS-Poll, which is a control packet for prompting the base station to transmit data, to the base station for requesting the base station to transmit downlink data destined thereto after the terminal station has transitioned to an active mode, in which a transmission/reception function turns on (step 101). Upon receipt of PS-Poll without error, the base station transmits a successful reception notification signal ACK (step 102). The terminal station transitions to a doze state in which the transmission/reception function turns off after it has completed the transmission of ACK.

FIG. 1B is a sequence chart illustrating a sequence of operations when data destined to the terminal station has been stored in the base station. The terminal station transmits PS-Poll to the base station, after it has transitioned to the active mode, for requesting the base station to transmit downlink data destined thereto (step 111). Upon receipt of PS-Poll without errors, the base station transmits a data frame (step 112). Upon receipt of the data frame without errors, the terminal station transmits ACK (step 113). The terminal station transitions to the doze state after it has completed the transmission of ACK.

FIG. 2 is a flow chart illustrating the operation of the terminal station in the foregoing situation. As the terminal station starts a receiving operation, it transitions to an active state (step 201). Next, the terminal station transmits PS-Poll to the base station for requesting the base station to transmit data destined to the terminal station (step 202). Next, the terminal station determines whether a response to PS-Pall from the base station is ACK or data (step 203). If the terminal station fails to receive either ACK or data, the terminal station again transmits PS-Pall (step 202). Upon receipt of ACK, the terminal station determines that there is no data destined thereto stored in the base station, and transitions to the doze state (step 205). Upon receipt of data, the terminal station transmits ACK to the base station (step 204), and transitions to the doze state (step 205), followed by termination of the receiving operation.

In the foregoing sequence of operations, when data destined to the terminal station is stored in the base station, the base station returns a data frame when it receives the PS-Poll signal from the terminal station without errors. However, conventional general wireless LAN base stations are often configured to return ACK to a terminal station in response to PS-Poll from the terminal station irrespective of the presence or absence of data to the terminal station. This is because it takes long time to complete the transmission of the data frame so that the base station informs, as a temporary measure, the terminal station that the PS-Poll signal has been received without errors. IEEE802.11 also approves that ACK is returned.

FIGS. 3A, 3B illustrate sequence charts when a base station returns ACK to a terminal station in response to PS-Poll from the terminal station irrespective of the presence or absence of data destined to the terminal station.

FIG. 3A is a sequence chart when no data destined to a terminal station is stored in the base station. The terminal station transmits PS-Poll to the base station after it has transitioned to the active mode for requesting the base station to transmit downlink data destined thereto (step 301). Upon receipt of PS-Poll without errors, the base station transmits ACK (step 302).

FIG. 3B is a sequence chart when data destined to a terminal station is stored in a base station. The terminal station transmits PS-Poll to the base station after it has transitioned to the active mode for requesting the base station to transmit downlink data destined thereto (step 311). Upon receipt of PS-Poll without errors, the base station transmits ACK to the terminal station (step 312). When data destined to the terminal station is stored in the base station, the base station further transmits a data frame to the terminal station (step 313). Upon receipt of the data frame without errors, the terminal station transmits ACK (step 314).

In this way, data communications in a power save mode in a general wireless LAN differs in a frame sequence chart between the terminal station and base station depending on the presence or absence of data destined to the terminal station stored in the base station. Then, as illustrated in FIGS. 3A, 3B, when the base station returns ACK to the terminal in response to PS-Poll from the terminal station irrespective of the presence or absence of data destined to the terminal station, the terminal station experiences difficulties in determining whether to transition to the doze state when no data is stored in the base station, resulting in difficulties in a reduction in power consumption. This is because the terminal station cannot determine the presence or absence of data destined thereto at the time it receives ACK, and therefore cannot promptly transition to the doze state. This is because the terminal station does not know whether or not data destined thereto is present in the base station at the time it receives ACK. Therefore, even if there is no data destined to the terminal station, the terminal station cannot transition to the doze state immediately after the receipt of ACK.

SUMMARY OF THE INVENTION

It is an object of the present invention to provide a power saving method in a wireless LAN system, which permits a terminal station to promptly transition to the doze state irrespective of the presence or absence of data destined to the terminal station in a base station.

To achieve the above object, in the power saving method of the present invention, upon receipt of a PS-Poll signal from a terminal station subordinate to a base station for prompting a transmission of data destined to the terminal station, the base station transmits an ACK signal to the terminal station for indicating a successful reception of the PS-Poll signal, and also transmits a data frame including data destined to the terminal station when there is such data, or transmits an empty data frame when there is no data destined to the terminal station. Then, upon receipt of the data frame (including the empty data frame), the terminal station transmits an ACK signal to the base station, and then transitions to the doze state in which a transmission/reception function is made inoperative.

As described above, according to the present invention, even when no data destined to a terminal station is stored in a base station, the base station performs the same operation in response to PS-Poll from the terminal station as the operation when data is stored therein, so that the terminal station can transition to the doze state after it has completed a sequential frame exchange procedure, thus making it possible to save the power in the terminal station.

The above and other objects, features and advantages of the present invention will become apparent from the following description with reference to the accompanying drawings which illustrate examples of the present invention.

BRIEF DESCRIPTION OF THE DRAWINGS

FIG. 1A is a sequence chart when no data destined to a terminal station is stored in a base station, and FIG. 1B is a sequence chart when data destined to the terminal station is stored in the base station;

FIG. 3A is a sequence chart when no data destined to the terminal station is stored in the base station, and FIG. 3B is a sequence chart when data destined to the terminal station is stored in the base station;

FIG. 4A is a sequence chart when no data destined to a terminal station is stored in a base station, and FIG. 4B is a sequence chart when data destined to the terminal station is stored in the base station.

DETAILED DESCRIPTION OF THE PREFERRED EMBODIMENTS

Figure 1:
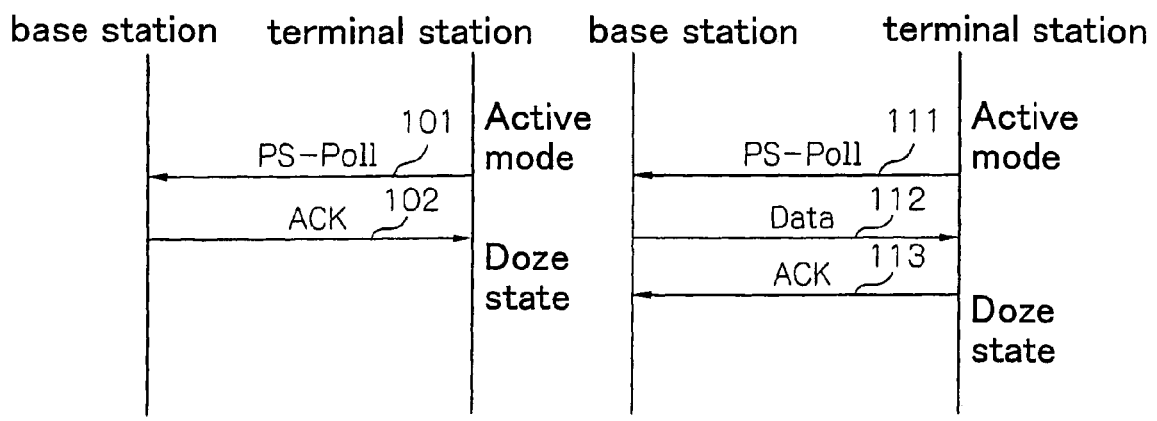
FIGS. 1A, 1B are sequence charts each illustrating a conventional power saving method in a wireless LAN system conforming to IEEE802.11, where
Figure 2:
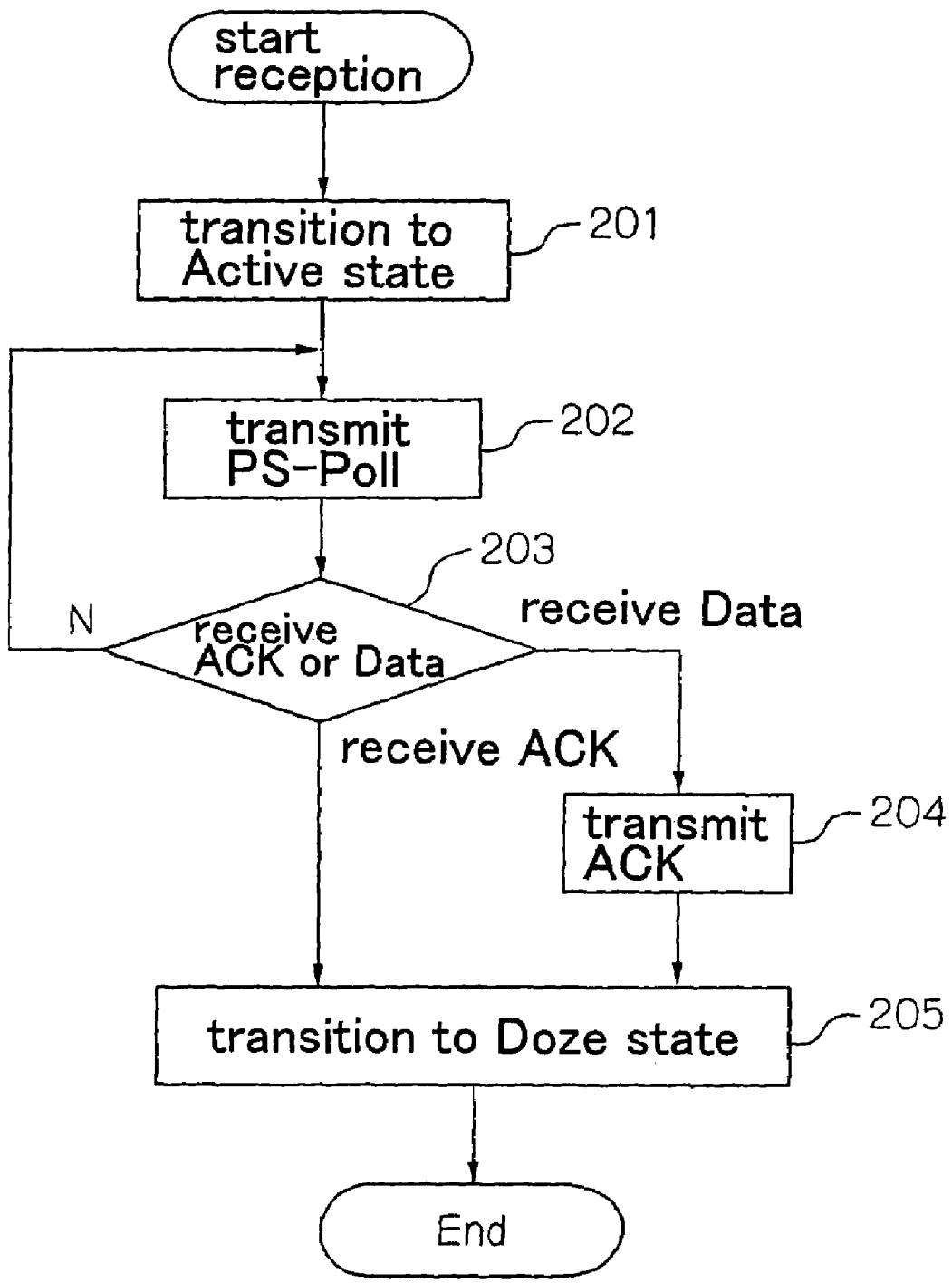
FIG. 2 is a flow chart illustrating a sequence of operations performed by the terminal station in the processes of FIGS. 1A, 1B.
Figure 3A:
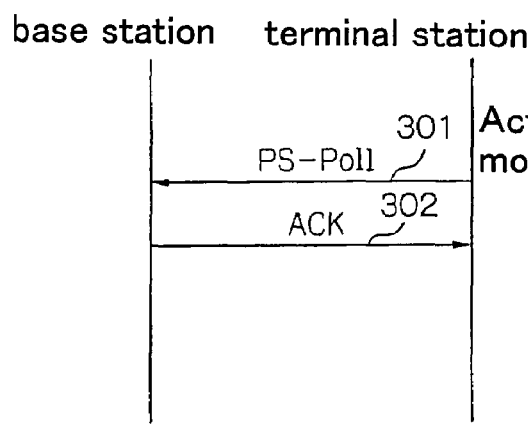
FIGS. 3A, 3B are sequence charts each illustrating the operation of a base station when it returns ACK to a terminal station in response to PS-Poll from the terminal station irrespective of the presence or absence of data destined to the terminal station, where
Figure 3B:
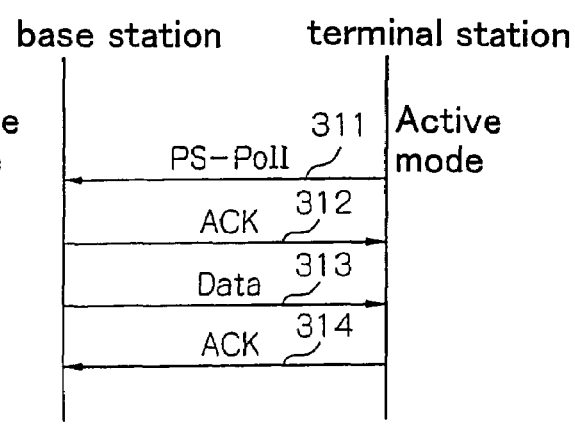
Figures 4A, 4B:
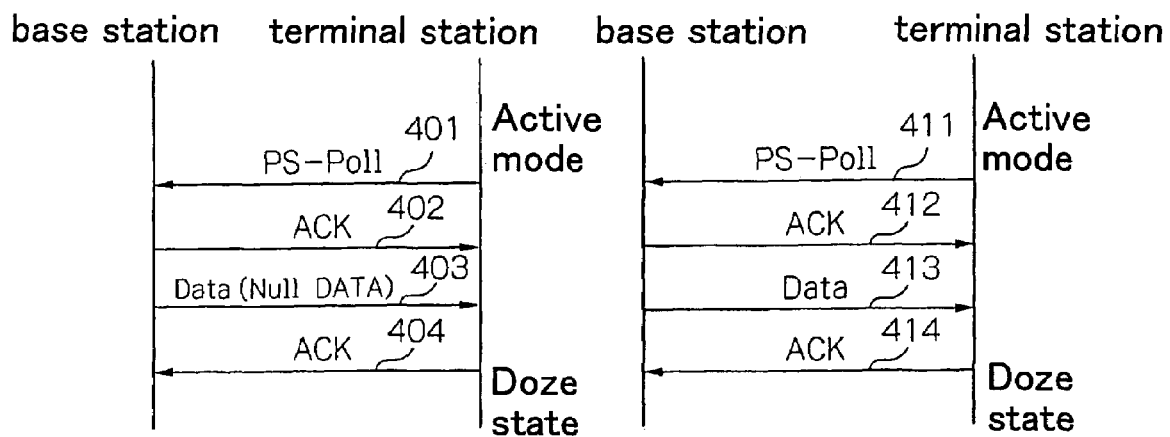
FIGS. 4A, 4B are sequence charts each illustrating a power saving method according to the present invention in a wireless LAN system conforming to IEEE802.11, where

FIGS. 4A, 4B illustrate sequence charts of a power saving method in a wireless LAN system conforming to IEEE802.11 in accordance with the present invention. Like the operations illustrated in FIGS. 3A, 3B, a base station returns ACK to a terminal station in response to PS-Poll from the terminal station irrespective of the presence or absence of data destined to the terminal station.

FIG. 4A is a sequence chart when no data destined to a terminal station is stored in a base station. The terminal station transmits PS-Poll to the base station after it has transitioned to an active mode for requesting the base station to transmit downlink data destined thereto (step 401). Upon receipt of PS-Poll without errors, the base station transmits ACK (step 402). The base station also transmits an empty data frame to the terminal station since the base station has not stored data destined to the terminal station (step 403). Upon receipt of this empty data frame without errors, the terminal transmits ACK (step 404). The terminal station transitions to a doze state after it has completed the transmission of ACK.

FIG. 4B is a sequence chart when data destined to the terminal station is stored in the base station. The terminal station transmits PS-Poll to the base station after it has transitioned to the active mode for requesting the base station to transmit downlink data destined to the terminal station (step 411). Upon receipt of PS-Poll without errors, the base station transmits ACK (step 412). Since the base station has stored data destined to the terminal station, the base station also transmits a data frame to the terminal station in response to PS-Poll (step 413). Upon receipt of the data frame without errors, the terminal station transmits ACK (step 414). The terminal station transitions to the doze state after it has completed the transmission of ACK.

In the foregoing manner, in this embodiment, the base station performs the same operation in response to PS-Poll from the terminal station even when the base station has not stored data destined to the terminal station as the operation when the base station has stored data destined to the terminal station, thus permitting the terminal station to transition to the doze state after the completion of a sequential frame exchange procedure (completion of the transmission of the ACK signal).

Figure 5:
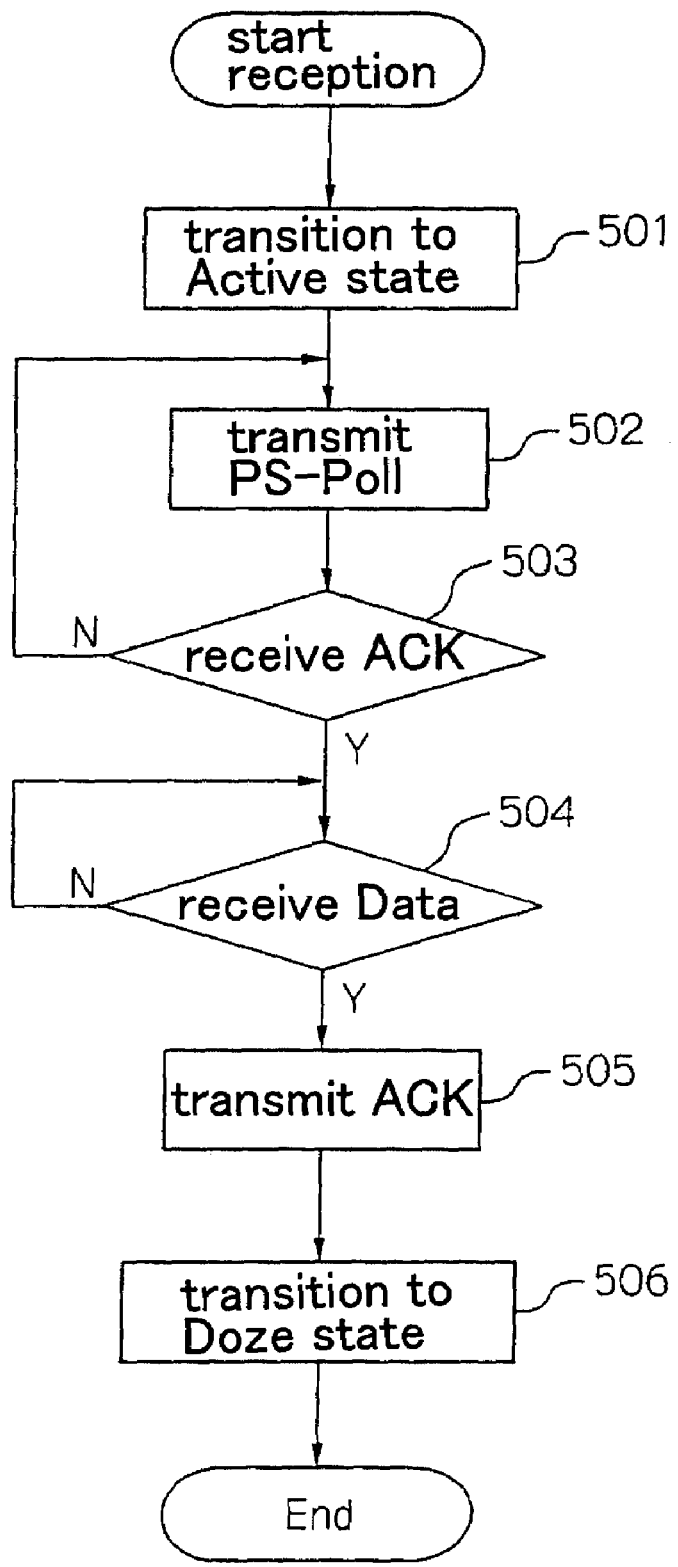
FIG. 5 is a flow chart illustrating a sequence of operations performed by the terminal station in the processes of FIGS. 4A, 4B.

FIG. 5 illustrates a flow chart representing a sequence of operations performed by the terminal station in the processes of FIGS. 4A, 4B. As the terminal station starts a receiving operation, it transitions to the active state (step 501). Next, the terminal station transmits PS-Poll to the base station for requesting the base station to transmit data destined to the terminal station (step 502). Then, the terminal station determines whether or not it receives ACK which is a response from the base station to PS-Poll (step 503). In the event of a failure in receiving ACK, the terminal station again goes to step 502 for transmitting PS-Poll. When ACK is successfully received, the terminal station receives data destined thereto, sent from the base station (the data frame received herein includes an empty data frame) (step 504). When receiving data, the terminal station transmits ACK to the base station, and transitions to the doze state (step 506), followed by completion of the receiving operation.

In another embodiment, when the terminal station comes under the control of a base station, the terminal station may determine whether the base station is a base station conforming to IEEE802.11 (i.e., a base station which only returns an ACK signal in response to PS-Poll from a terminal station when there is no data destined to the terminal station) or a base station which embodies the present invention (i.e., a base station which returns not only an ACK signal but also an empty data frame in response to PS-Poll from a terminal station even when there is not data destined to the terminal station, to select the sequence charts illustrated in FIGS. 3A, 3B or FIGS. 4A, 4B.

While preferred embodiments of the present invention have been described using specific terms, such description is for illustrative purposes only, and it is to be understood that changes and variations may be made without departing from the spirit or scope of the following claims.

What is claimed is:

1. A power saving method in a wireless LAN system, comprising the steps of:

determining, from Association Response information received from a base station when a terminal station is subordinate to said base station, whether said base station is a base station capable of transmitting an empty data frame in response to a signal even when said base station does not have data destined to said terminal station;

upon receipt of a signal at said base station from said terminal station subordinate to said base station for prompting a transmission of data destined to said terminal station, transmitting an ACK signal indicative of a successful reception of the signal to said terminal station, and transmitting a data frame including data destined to said terminal station when there is such data, and transmitting an empty data frame when there is no data destined to said terminal station; and upon receipt of the data frame at said terminal station and only when said terminal station is subordinate to said base station, transmitting an ACK signal to said base station and transitioning to a state in which a transmission/reception function is made inactive.

2. A terminal station in a wireless LAN system, comprising:

first means for transmitting a signal to a base station to which said terminal station is subordinate for prompting a transmission of data destined to said terminal station;

second means responsive to a data frame received from said base station for transmitting an ACK signal to said base station and bringing said terminal station into a state in which a transmission/reception function is made inoperative; and third means for determining, from Association Response information received from said base station when said terminal station is subordinate to said base station, whether said base station is a base station capable of transmitting an empty data frame in response to signal even when said base station does not have data destined to said terminal station, and operating said second means only when said terminal station is subordinate to such a base station.

3. The terminal station of claim 2, further comprising said base station in a wireless LAN system, the base station comprising means responsive to a received signal from said terminal station subordinate to said base station for prompting a transmission of data destined to said terminal station for transmitting an ACK signal indicative of a successful reception of the signal to said terminal station, and means responsive to the signal received from said terminal station for generating and transmitting a data frame including data destined to said terminal station when there is such data, and for generating and transmitting an empty data frame when there is no data destined to said terminal station.

* * * * *